United States Patent
Moreno

[11] 4,007,355
[45] Feb. 8, 1977

[54] DATA-TRANSFER SYSTEM
[75] Inventor: Roland Moreno, Paris, France
[73] Assignee: Societe anonyme dite: Societe Internationale pour l'Innovation, France
[22] Filed: Mar. 21, 1975
[21] Appl. No.: 560,874
[30] Foreign Application Priority Data
    Mar. 25, 1974  France ............................. 74.10191
    Mar. 17, 1975  France ............................. 75.08186
[52] U.S. Cl. ........................: 235/61.7 R; 340/149 A
[51] Int. Cl.² ................... G06K 1/14; G06K 19/00; G07F 7/02
[58] Field of Search ........... 340/149 A; 235/61.7 R, 235/61.7 B, 61.12 N, 61.6 R, 61.6 H, 61.11 R

[56] References Cited
UNITED STATES PATENTS

| | | | |
|---|---|---|---|
| 3,662,343 | 5/1972 | Goldstein ....................... | 340/149 A |
| 3,719,927 | 3/1973 | Michels et al. ................. | 340/149 A |
| 3,845,277 | 10/1974 | Voss et al. ..................... | 235/61.7 B |
| 3,852,571 | 12/1974 | Hall et al. ...................... | 235/61.7 B |
| 3,906,460 | 9/1975 | Halpern ......................... | 235/61.7 B |

Primary Examiner—Vincent P. Canney
Attorney, Agent, or Firm—Pierce, Scheffler & Parker

[57] ABSTRACT

A system for transferring data between persons, for example in lieu of cash transactions, requires that each person to or from whom data is to be transferred carries a portable electronic device including a memory. Data transfer means in the form of data recording devices are provided at fixed locations which cooperate with the portable electronic devices to transfer data into or out of the portable electronic devices. Preferably both functions may be effected at each location. Data taken from a portable electronic device may be recorded in another portable electronic device for transfer elsewhere. The portable electronic devices may be in the form of flat cards in which logic microstructures are encapsulated.

7 Claims, 8 Drawing Figures

DATA-TRANSFER SYSTEM

This invention relates to systems for the transfer and interchange of data between at least two populations of persons.

Such systems are known. In particular, U.S. Pat. No. 3,702,464 describes a system comprising:
- on the one hand at least one portable device including a memory,
- on the other hand, a plurality of geographically separated peripheral units connected to a central computer comprising a central recording memory.

The peripheral units comprise control means allowing control of the data between the central memory of the computer and the portable device, provided that this latter is coupled to one of the peripheral units.

Such a system, whatever the degree of organisation of the portable devices, of the peripheral units and of the central computer, presents a major inconvenience. In practice, it requires a network of complex interconnections between the central coordinating station and the peripheral units. As a result the installation costs are high and on the other hand the reliability is compromised by the likelihood of faults arising in the interconnecting network, the probability increasing as the complexity of the network increases.

It is an object of the invention to overcome the inconvenience of the known system, while permitting data from geographically disparate sources to be connected up to a central organism in an economic and reliable manner.

To remedy the inconvenience of the known systems it is proposed, contrary to the tendency towards centralisation which are dominant at the present time, to construct a plurality of independent devices, each autonomous, comprising means (writing means, etc.) permitting data to be transferred between the portable device and a cooperating apparatus at any position.

Thus, in accordance with a principal characteristic of the invention, a system for exchanging and transferring data between at least two populations of persons, the persons of each of these two populations being geographically dispersed, comprises:
- a plurality of independent data recording devices, distributed at definite geographical positions,
- a plurality of portable electronic devices, distributed among and carried by the persons constituting one of the populations.

Each of the portable devices comprises:
- a memory; preferably this memory is incorporated in an inaccessible manner in the interior of the portable device; preferably likewise the memory is inert, not requiring a power supply, and of a semi-conductor type,
- coupling means permitting any one of the portable devices to be temporarily coupled at will with one of the data recording devices or with one of the writing devices,
- memory control circuits interconnected between the coupling means and the memory;
- the memory and the control means being constructed in the form of logic microstructures.

The portable devices are arranged to store the data to be transferred in a readily portable form.

Each data recording device comprises:
- a means for reading the contents of the memory in a portable electronic device while the latter is coupled with a data recording device.
- means for recording the data contents of the memory in the portable electronic device which is coupled with the said reading means.

With this combination of means, each person may receive, in the form of a recording, the contents of the memories of each of the portable electronic devices without it being necessary to pass through the intermediary of a central computer.

In addition, so that each person of one of the population may be able to receive the data of persons of the other population and vice versa, the system additionally comprises, in accordance with an additional feature of the invention, a plurality of independent writing devices; distributed in geographically fixed positions; in addition, the memory of the portable electronic device possesses programmable recording sections; each writing device includes a writing means permitting data to be written into the programmable memory of the electronic portable device when this latter is coupled to the writing device. With this combination of supplementary means it is possible to write data into the memory of each of the electronic portable devices.

Preferably, the means for writing, reading and recording are interconnected and contained in a single transfer device. This is particularly the case for the applications envisaged hereinafter, but this particular arrangement is not essential.

Such a system may be employed for various purposes; its use for keeping a health record may be envisaged;
- the patient possesses a health record (in the form of a portable electronic device) containing in the memory the various medical details which concern him,
- the doctor whom he goes to consult who is not necessarily his usual doctor — possesses a specific data recording device which allows him to read the contents of the memory of the record and to record in another memory at his disposition the information of which he has need to make his diagnosis and then to write into the memory of the health record the most recent medical information concerning the patient.

In accordance with another principal object of the present invention the data recording means comprises:
- on the one hand a writing means situated in the interior of the specific recording means,
- on the other hand at least one portable electronic device comprising a memory having programmable memory sections, especially sections programmable in an irreversible manner; preferably this memory is an inert memory, not requiring a power supply, of the semiconductor type; preferably likewise it is incorporated in an inaccessible manner in the interior of the said portable electronic device,
- coupling means accessible on the exterior of the portable electronic device connected with the memory and permitting it to be temporarily coupled at will with the writing means of the said recording means,
- memory control circuits interconnected with the coupling means and the memory,
- the memory and the control means being constructed in the form of logic microcircuits, i.e. micro-structures.

With this construction, especially of the recording means, it is possible to store, periodically to transfer, conveniently and in a reliable manner towards a central computer, for example, the data to be passed on; it is sufficient to transmit the portable electronic device, by messenger, by post, by pneumatic tube, etc. to the site of the central computer; this latter is constructed so that it is capable of reading the contents of the memory in the portable electronic device.

It is stressed that this novel solution consisting in using two portable devices and one transfer electronic device in place of a system of interconnections is in fact more economical and more reliable than the system of interconnection and that it is perfectly suitable for transferring a small number of data items (scattered) with a relatively unimportant lapse of time.

Such a system may be used to keep a bank account. For the special needs of this particular banking application, the system is additionally arranged to transfer the data in a confidential manner; to this end and in accordance with an additional characteristic of the invention;

each of the said portable electronic devices includes another programmable memory containing the identification data written in once for all, each of the said transfer devices (for recording and-/or writing) comprises an identification comparator arranged to:

compare the identification data contained in the said other memory with given data introduced into the transfer device by the bearer of the portable electronic device, to authorise the setting in operation of the transfer device only when there is agreement between the compared data.

The operation to be performed for keeping a bank account and the manner in which the system to be described may be used to keep a bank account will be briefly reviewed:

1. The purchaser and holder of a payment card (the portable electronic device) inserts this latter in the transfer device (likewise called elsewhere the specific device) situated at a point of sale (more generally the place at which the purchaser must settle for his purchases).

2. The transfer device checks the identity of the payer by comparing the identification data contained in the payment card with the confidential code introduced directly into the transfer device by the payer.

3. The transfer device determines the credit balance, starting from the information contained in the card and comparing it with the amount of the purchase introduced directly into the transfer device by the cashier.

4. The transfer device writes into the payers payment card the new balance available (lower than the former balance).

5. The transfer device inserts in a memory which is available to the trader (a memory which may be constructed in the form of a commercial portable card) the banking coordinates of the payer and the amount of the purchase.

6. The trader later communicates to his banker the trading card containing the banking coordinates of his clients and the amounts of their purchases, so that the banker then causes the amounts of the purchases to be paid by the bankers of the different payers and credits the account of the trader with these amounts.

There will now be described by way of non-limiting example some embodiments of the system according to the invention, reference being made to the drawings, of which.

The description to be given below require the following general comments.

All the described embodiment are specifically intended for banking and accountancy applications; as a result and in order to facilitate following the description, there has broadly been used to explain their manner of operation a terminology proper to banking and to the keeping of a bank account. The described arrangements may, however, have quite different applications and may be utilised in any application where it is necessary to transfer data between persons at different locations and where it is necessary to direct some or all of the data to a single central organisation.

The electronic circuits of the portable electronic devices (memories, etc) are, because of their banking application, incorporated in the portable electronic devices in an inaccessible manner (in order that they cannot readily be fraudulently used); the portable devices are conveniently in the form of a flat rectangular card. The electronic devices are incorporated in an inaccessible manner in the card, that is to say, so that it is not possible to obtain access to the electronic circuits without destroying the card. It is therefore particularly convenient for the electronic circuits to take the form of logic microstructures (integrated circuits) the components of which are hardly to be distinguished under the microscope, and are encapsulated in an opaque plastics resin. Other mechanical solutions can be envisaged, however. The coupling means are the only elements providing access to the electronic components contained in the card; such access may be obtained either electrically or optically.

It should be noted, however, that these supplementary technical precautions, indispensible in the case of banking applications, in order to prevent attempts at fraud, may be superfluous in other applications where the risk of fraud does not arise.

Finally, it should be noted that the inert integrated-circuit memories employed in these embodiments and incorporated in the cards may be of different kinds; particularly either of the programmable or reprogrammable type. Such memory devices do not require any energy to store the information. On the other hand, the writing of information generally requires a substantial amount of energy (several watts instantaneously); in consequence, the makes guarantee an indefinite storage time in the case of programmable memories or an extremely long storage time, of the order of several tens of years, in the case of reprogrammable memories. The following references to memories of these types may be given:

Harris 7620, Monolithic Memories 6340, Texas Instruments 74 S 387, Intersil 5604, these non-erasible (destructible) memories are of the fusible or junction breakdown type.

Intel 1702 and National Semiconductor 5230; these memories are erasible by exposure to a source of ultraviolet radiation or of X-rays.

Memories with capacities of 4096 bits are currently fabricated by certain makers, particularly in the field of MOS (erasible) memories. Modern processes for the interconnection of integrated circuit chips thus allow the construction at low cost of a memory block of 16 kilobits or 32 kilobits (4 or 8 chips) with an area of some tens of square millimeters, so that such a memory block may be included in a card having the dimensions of 2 × 60 × 80 mm.

As a result, these inert memories of semiconductor are particularly well adapted for use, in preference to others, in storage systems for data transfer in accordance with the invention; in particular, in applications concerning banks and the keeping of a bank account.

A data-transfer device (specific device) will now be described with particular reference to a bank-note dispenser, the description is given with reference to FIGS. 1 to 3. The system to be described comprises two distinct portions which, when in operation, are connected through an interface denoted by a chain line. The two parts of the system are as follows:

To the left of the chain line: a portable electronic device not requiring a power supply, advantageously a ring, a card, a pendant, a pen; incorporating a certain number of electronic circuits (carried out for example as integrated circuits);

To the right of the chain line: a device to be controlled, advantageously a bank-note issuing device, or a cash register in the case of direct use at the point of sale; in this latter case, the debiting operation described above is not accompanied by the supply of bank-notes, but the writing into the cash register of the trader of information ultimately permitting the latter to obtain from the bank of the carrier of the ring (etc), a repayment in cash or script.

For clarity, we have restricted this description to the assumption of the issue of bank-notes, otherwise the electronic arrangements are exactly similar to those which would be used for a cash register.

The circuits in the ring comprise an identification memory 40, a debit memory 50 and a credit memory 51. The system allows the following operations to take place in the course of a single utilisation: identification of the carrier of the ring, an operation which authorises or rejects the remainder of the operation; possible reading of a document relative to an authorisation of credit and copying of the sum to be credited from this document into the credit memory in the ring; debiting in cash money a required sum, if, and only if, the state of account of the carrier of the ring allows it, taking into account the amount of the sum; recording of the whole of this process, at the end of accounting and/or possible final checking on a support such as a semi-conductor memory, magnetic disk or tape, cassette, etc...

The operation is to be effected by the carrier of the ring are as follows:

Possible introduction of a credit authorisation into the reader 144 setting up on the keyboard 31 of the confidential identification number, possible setting up of the sum to be debited on keyboard 63; these three preliminary operations may be effected in a different chronological order;

finally, introduction of a projecting portion of the ring into a corresponding receptical provided on the distributor box.

At the moment when the carrier of the ring effects the last operation which he must perform, that is to say, the introduction of the ring into the distribution box, all the operations set out above are effected very rapidly. The arrangement will have finished its operation almost instantaneously, permitting one of the following results, which are made possible according to the choice of the carrier ring and the state of his account;

simple verification of the state of the account by numerical display of the sum on a display means 69;

verification of the state of the account after the introduction of a sum to be credited by the introduction of an "authorisation of credit", which is absorbed, erased or destroyed in some manner not shown after the sum to be credited has been written into the credit memory of the ring;

verification of the state of the account after the introduction of credit, and a debit operation in cash money by the distributor, the credit state of the account after these two operations being necessarily positive or zero;

verification of the state of account after cash money has been debited by the distributor, as in the preceding case the debit will not take place unless it corresponds to a positive or zero amount left in the account.

Figure 2:
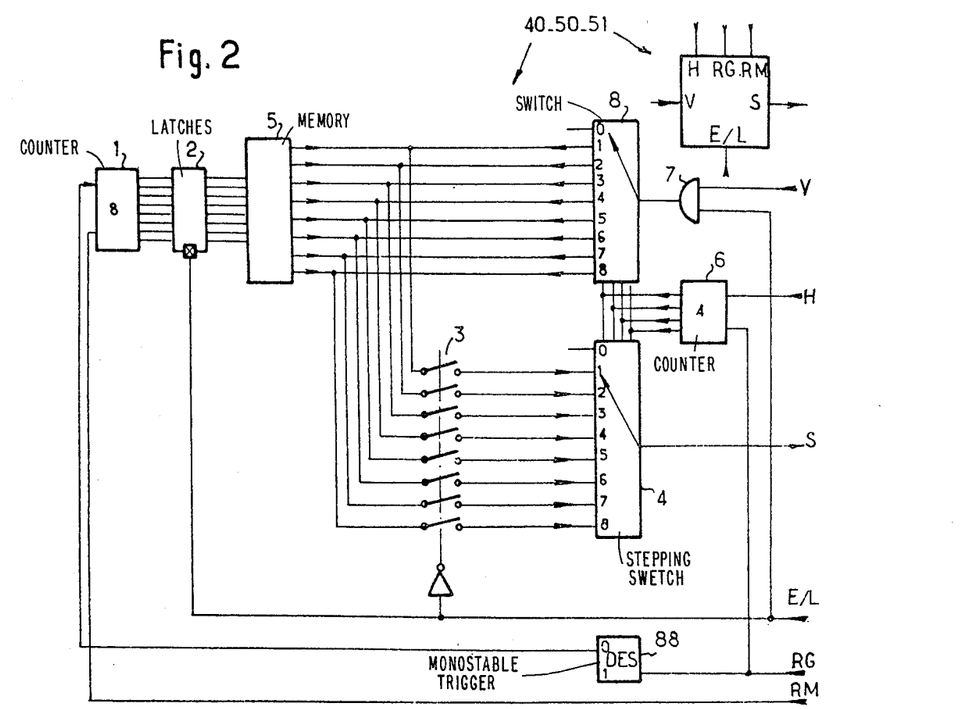
FIG. 2 is a diagram explaining the operation of an embodiment of an integrated circuit memory.
Figure 3:
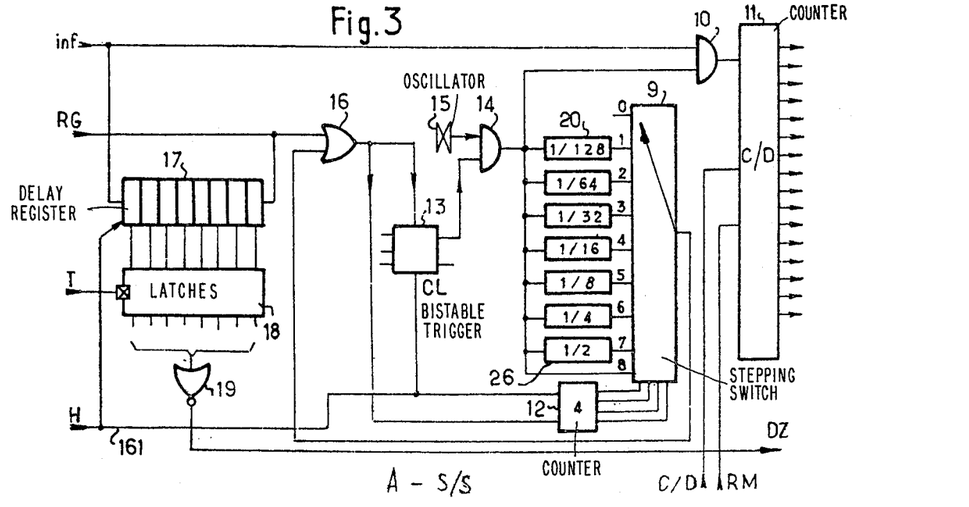
FIG. 3 is a simplified diagram of a sequential adder/-subtracter.

The different operating sequences of the arrangement, which are performed by the arrangements to be described below, are as follows:

supply of the ring;

setting up the general control path for the different elements of the arrangement by initiation of the switch 38;

operation of one of three memories (FIG. 2.);

operation of one of the two sequential adder/subtractors; (notes $a - s/s$) (FIG. 3);

reading the previous credits;

reading the new credit;

reading the previous debits;

reading the new debits.

The note distributor device includes a power oscillator 150 which feeds a winding 151. When the ring is fitted to the distributor, the primary winding 151 is coupled to a secondary winding 105 which forms a part of the circuits in the ring; this winding thus provides, by way of a rectifier device comprising a diode 106 and a non-capacitive electronic filter 107 a direct voltage for the different supply circuits of the ring. Possibly, this electro-magnetic coupling may be replaced by an optical coupling, the elements 150 and 151 being replaced by a light source, and the winding 105 by an electrovoltaic pile. The coupling of the ring and the distributor is effected simply by introducing a projecting portion forming a part of the ring into a corresponding receptacle provided on the distributor box. The effect of this introduction is to mechanically close a contact 27, which forms part of a general supply arrangement (not shown) for the circuits of the note distributor. Simultaneously, a delay device 28 is initiated which applies a level 1 to a first input of a OR gate 41; this one level is maintained during a time sufficient for the identification of a carrier of the ring to be effected normally; it should be noted that the second entry of the OR gate 41 which corresponds to the output of the trigger 42 is then set to nought by the operation of the trigger 42 produced by the appearance of a one level at its input CL by way of an OR gate 86. If this attempted identification is successful (it will be seen later in what conditions and how this is effected), the feed connection is maintained until the end of the operation of the distributor, thanks to the presence of a one level on the second input of the OR gate 41.

The absence of this signal, which denotes that the user has employed a false identification number, on the other hand, suppresses the power supply by the presence of a zero level at the two inputs of the OR gate 41, the level one on the first entrance falling back to zero and the level one on the second entrance not having been established so that the note distributor cannot be made use of. The practical contruction of the note distributor 28 is well known in the art and does not form a part of the present invention.

It should be noted that the arrangement here described is carried out using positive logic.

Setting up the General Control Channel

When a logic level 1 appears at one of the two inputs of the OR gate 41, it is transmitted through this gate to the AND gate 34 and, in parallel, to a rising monostable trigger 35; the rising monostable trigger 35, the stable state of which is indicated with respect to each of the two inputs by one and nought, sends an impulse of complementary value (1 on the output marked 0 and 0 on the output marked 1) in response to the appearance of a rising edge at its input; for the duration of the impulse emitted by the monostable trigger 35, the output marked 1 transmits a zero logic level to a second input of the AND gate 34 which thus remains closed; the second output of the rising monostable trigger 35 sends a positive impulse to the reset input of counter 36, which controls the stepping switch 38. At the end of the impulse emitted by the rising mono-stable trigger 35, the stable state 1 appears at the output marked 1 of this latter, which has the effect of opening the AND GATE 34. This then allows the passage of a first impulse provided by a clock oscillator 33; this impulse, transmitted to counter 36, causes the stepping circuit 38 to move to its first position, the output position marked 0 corresponding to the conductor marked *t* and numbered 160; it is transmitted simultaneously to the input of the descending mono-stable trigger 36, which functions simultaneously to the ascending mono-stable trigger 35, with the only difference that it yields an output impulse only for a descending edge as its input; this impulse, positive at the output marked 0 of the device 37, is transmitted by way of the stepping switch 38 to the output marked 0; after this impulse, this part of the apparatus remains inactive until the appearance of the subsequent impulse emitted by the clock oscillator 33 and the cycle repeats, identically to the previous cycle, the counter 36 causing the stepping switch 38 to pass from the output marked 0 to the output marked 1, the said following impulse emitted by the oscillator 33 being transmitted with delay and after being re-shaped by the descending mono-stable trigger 37, to the output marked 1 (generaly reset RG marked 161) of the stepping switch 38; the operating cycle is thus described successively for the ten output states of the stepping switch 38, the eight latter outputs all transmitting a positive impulse to the same conductor of the general clock (162) by way of the OR GATE 39; it should be noted that the outputs state marked 9 of the stepping switch 38 is immediately followed, in the cyclic operation preceding the described, by the output state mark 0; that is by that part of the arrangement which effect the control of the system during the whole of its operating time, as will be seen below.

In addition to the supply to the ring circuits, the transmission of data between the ring and the distributor is effected in both directions by optical coupling between light-emissive diodes and photo diodes. Reading the confidential identification number:

after the appearance of a positive impulse at the 0 output of the rising mono-stable trigger 35, a logic level 1 is transmitted by way of the OR GATE 60 and the optical coupling 45 to the memory reset input, which sets it to the first page of credit memory 50 and of debit memory 51, to initiate the subsequent process of reading (by 'page' there is to be understood an assembly of several memory stages in parallel, each of them corresponding to a non-conductive or conductive state, according to whether it has been written or not in an irreversible manner). This logic signal also sets to the same zero state of count the sequential adder/subtractors 32 and 49 and resets the counter 47 to zero; as to the memory 40, it is permanently set to the first page by a constant one level on its memory reset input (a level denoted by a plus sign in FIG. 1), for it contains only a single page which in principle and preliminarily is written for the duration of the life of the ring, which memory contains the confidential identification number of its bearer, written at the time when the account is created. It should be noted that the confidential code is devised in a non-representative manner, so that it represents the carrier of the ring as well as his bank.

The memory 40 in the ring (FIG. 2) is permanently in the read condition owing to the presence of a zero level at its read-write input, which employes the closure of the mechanical contact 3 and the inhibition of the latches 2, the eight-bit counter 1 followed by the latches 2 serves to address the memory 5 (a single address here, which is that of the first page; for the credit and debit memories, the passage from one page to the other is made at the beginning of each clock cycle by an impulse at the input RG (161), an impulse delayed by the descending mono-stable trigger 88 which causes the address counter 1 to advance one step; the first impulse which appears on the conductor 16 resets the four-bit counter 6 controlling the output stepping switch 4 and causes the counter 1 to advance one step, after having been delayed by the descending mono-stable trigger 88. In accordance with their order of arrival, the clock impulses detect in the selected page of the memory module the value of the different bit present at the output considered, from the bit of greatest weight to the bit of least weight, which are transmitted in sequence through the coupling 104 to the add-subtract circuit 32 which determine by binary parallel counting a number $x$ which is sent to the input of a comparator 30; at the other input of the comparator 30 there is already present in the same form a number $y$, which has been transcoded in a manner not shown starting from the identification number previously composed on the decimal keyboard 31 by the carrier of the ring, in case of equality of $x$ and $y$, the comparator 30 sends by way of the AND GATE 85 a one level to the "preset" input of the bistable trigger 42, which changes state, applying a logical one level from its output to the input of the OR GATE 41, which assures the continuing operation of the clock 33 after the delay circuit 28 has ceased to operate. The presence of the AND GATE 85 requires the carrier of the ring to compose his confidential code within a predetermined delay period, corresponding to the delay time of the delay circuit 28.

Figure 1:
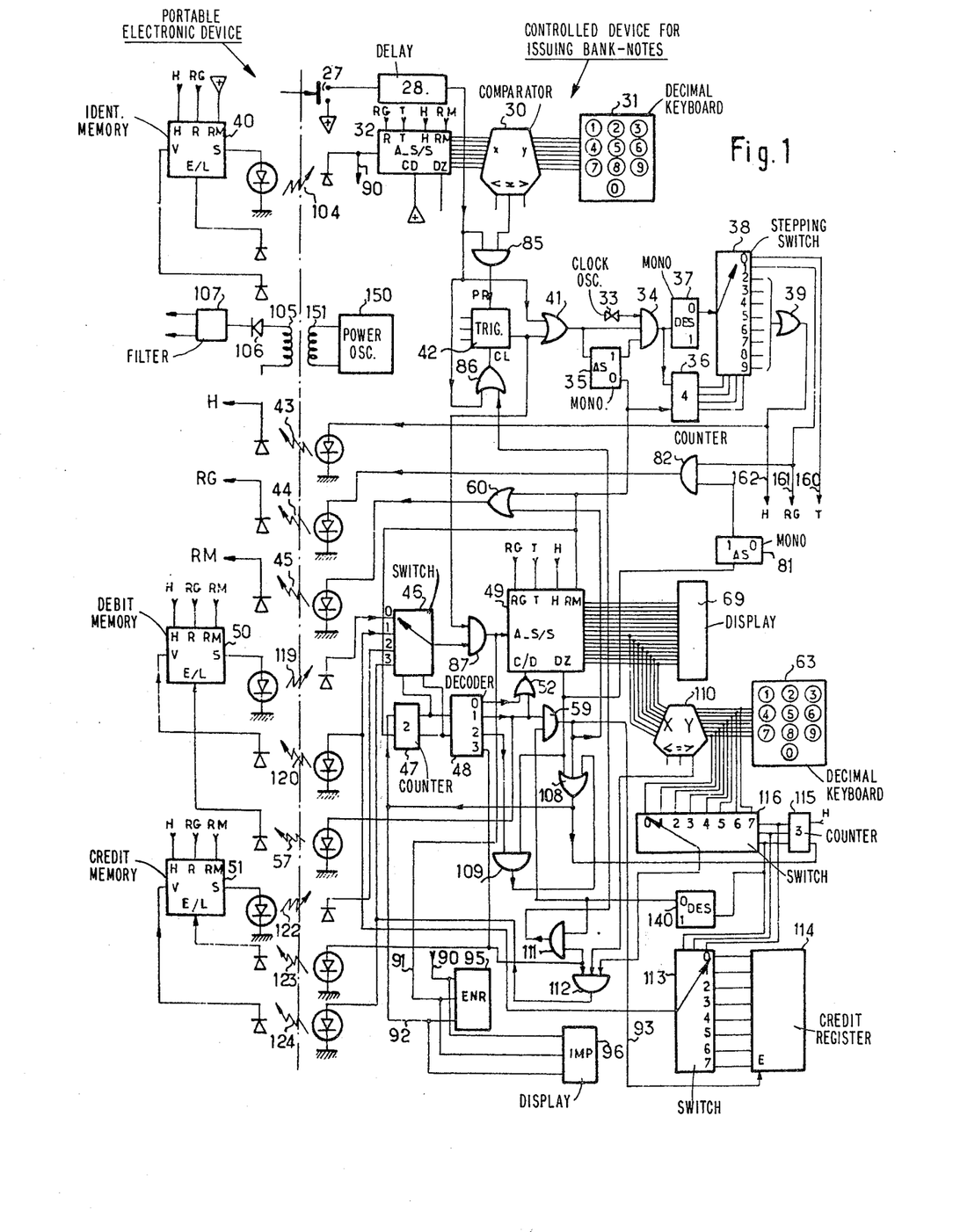
FIG. 1 shows a general functional diagram of a transfer device used to dispense bank-notes, comprising means for reading, writing, recording, data processing and an identification comparator.

Operation of sequential add/subtract identification circuit 32 (FIG. 3):

In this particular case the element 32 operates solely as an adder; it is maintained in the positive counting condition by the presence of a one level permanently added up-down counting input marked $c/d$, symbolised by a plus sign in FIG. 1. It comprises essentially a 16-bit up-down counter 11 (of which only the eight least significant bits are employed here) to which are directed, in the presence of a positive information bit at the input of the AND GATE 10 originating from a memory 40, impulses originating from the oscillator 15 by way of the AND GATE 14. The general reset signal arising on conductor 161 closes the AND GATE 14 by way of the OR GATE 16 and the bistable 13 and resets the four-bit counter 12 to zero, which sets the stepping switch 9 to its "off" condition mark 0; the first clock impulse causes the switch 9 to advance one step, causing it to pass to its one input, by operating on the counter 12, and causes the element 13 to change state, which suppresses the inhibiting input at the input of the AND GATE 14, which allows the passage of impulses from the oscillator 15, which is 300 times more rapid than oscillator 33; before the second clock impulse, 128 impulses from the oscillator 15, in the present case, introduced by way of the AND GATE 10 into the 16-bit up-down counter 11; at the end of the 128 impulse, the frequency divider 20 sends a logic level 1 to the input marked 1 of the switch 9, which inhibits the AND GATE 14 by causing the trigger 13 to change state by way of the AND GATE 16; the system remains inactive until the appearance of the second clock impulse which places the switch 9 into its input state 2 and the preceding cycle is repeated; the following information arriving at the gate 10 corresponds to the reading of the value of the bit of weight immediately lower than that of the bit of greatest weight (second bit on the first page of the memory 40); the confidential identification number is thus read, translated into a number of impulses equal to its value, written in binary code in a stable manner into the device 11 and transmitted in parallel to the $x$ input of the comparator 30 (see FIG. 1). The delay register 17, having series input and parallel output (FIG. 3), followed by latches 18 and by the OR GATE 19, provides a one logic level at the end of an empty page, that is to say, of which all the bits contain the information 0, nothing having been written therein. This zero detector arrangement, mark DZ, is not utilised here; on the contrary, it is in the adder/subtractor 49, as will be seen below.

Reading previous credit (see FIG. 1)

After a logic level 1 appears at the output of the comparator 30, it is transmitted by way of AND GATE 85 (the delay circuit 28 being theoretically not yet stopped), which corresponds to the preset input mark PR of the bistable trigger 42; the output of this latter trigger, passing from 0 level to 1 level, maintains the operation of the general clock until the end of the operations of the whole distributor; this level 1 is transmitted to one input of the AND GATE 87, thus keeping it open until the end of the operation of the device, the devices 50, 51, 49, 47 and subsequently 46 and 48 have already been reset to zero as has been seen above; at the beginning of the general clock cycle following the cycle of identification of the carrier of the ring, the information contained in the credit memory 50 are introduced into the sequential adder/subtractor 49 through the intermediatory of the output S of the memory 50 and the coupling 119, according to a method identical with that of reading the confidential identification number during the first clock cycle; the passage from one page of the memory 50 to the following page is effected, at the level of the memory 50, by an impulse provided at the beginning of the subsequent clock cycle on the conductor RG 161 by way of the coupling 44; the sum of the values of all the previous credit introduced into the credit memory in the manner described below, appears in a stable manner at the output of the sequential adder/subtractor 49, in binary forms; it is displayed on a display device 69 after transcoding (not shown), this type of operation being well known in the art. The same remark relating to the inverse transformation is also true at the level of the of the decimal counting system 31 and 63; it is to be noted that during the operation of reading the credit the sequential adder/subtractor 49 is in fact in a counting condition, owing to the presence of a one logic level at its input by way of the output mark 0 of the switch 48 and and AND GATE 52; after the arrival of the value contained in this last written page of the memory, the page which is read on the following clock cycle is an empty page, which is detected in the sequential adder/subtractor 49 by the presence of a 1 logic level appearing at the detector output marked Dz by way of the delay register 17 with series input and parallel output (FIG. 3), and the eight latches 18 operated at the beginning of the second clock cycle by the T output and the NOR gate 19. This one level inhibits the clock impulse RG 161 by way of the output marked 0 of the rising monostable 81 (FIG. 1) and the AND gate 82 so as to retain the address in the memory 50 and permit the writing of a possible new credit required by the carrier of the ring on that empty page.

Writing of new credit

The same 1 logic level indicating zero detection, passing through the OR gate 108 causes the counter 47 to advance one step, and in consequence sets the switch 46 to its input position marked 1 and the switch 48 to its output position marked 1, which keeps the adder/subtractor 49 in the condition of positive counting owing to the presence of a 1 logic level on the other input of the OR gate 52; this same 1 logic level is transmitted by way of the coupling 57 to the read write input of the credit memory 50, which places this latter in the writing condition by supressing addressing at the level of the latches 2, opening of the mechanical contact 3 and opening of the AND gate 7. The entry of the information in the serial mode into the page in which it is to be written is then effected by way of the switch 113 (FIG. 1) both the control of the credit memory by way of the coupling 120 and also that of the sequential adder/subtractor 49 by way of the switch 46 being effected while the switch 113 is controlled by the counter 115, which in turn is driven by the general clock; the value of the amount to be credited is then written into the first empty page in the credit memory 50 and added to the sum preceedingly displayed on the display device 69 by way of the 16-bit up-down counter of the sequential adder/subtractor 49. The end of the written page is detected by the AND gate 59 the two inputs of which are both at a logic level 1 at this moment the first input being the output marked 1 of the switch 58, the second being the output of the output of greatest weight of the counter 115 by way of the descending monostabled 150, the exact purpose of which is to detect the passage of the counter 115 from state number 7 to state number 0 when reading and writing the new credit into the memory 50 is terminated, the corresponding value is erased in a manner not shown by the reading of the credit register 114 by the appearance at its input E of a logic level 1 transmitted by the conductor 93. The output of the AND gate 59, taken to logic level 1, then resets to zero the credit and debit memories by way of the OR gate 60 and the coupling 45 and, by way of the OR gate 108, causing counter 47 to advance one step.

Reading of former debits

The new position of the counter 47 sets the switch 46 into its input 2 state (reading the memory debit 151), establishes the output 2 of the decoder 48 in the logic state 1, the 0, 1 and 3 outputs of this latter being at the logic level 0, which puts the sequential adder/subtractor 49 in a condition of counting down by the presence of a 0 level at its C/D input; the reading of the previous debits is then effected similarly to the operation effected previously on the credit memory 50, by way of the coupling 122, the number representing the sum of these debits being subtracted from the number already written in binary representation into the 16-bit up-down counter of the sequential adder/subtractor 49, that is to say subtracted from the number preceedingly displayed in the display means 69. The first blank page of the debit memory is detected by the AND gate 109 by the presence at the Dz output of the sequential adder/subtractor 49 of a logic level 1; it should be noted that at the moment when this information appears, the outputs of the sequential adder/subtractor 49 are in a numerical state representing in stable binary notation, corresponding to the operation $X$ = (sum of previous credits) + (new credit) − (sum of previous debits)

This value $X$ being necessarily positive, even in the case where the new credit is zero; on the assumption of a previous nil balance and the writing-in of a new nil credit, the value $X$ will obviously also be nil, which constitutes one limiting case.

The value of the amount intended to be finally debited by the note-distributor, set up before the introduction of the ring into the distributor by its bearer on the keyboard 63 in decimal notation, is compared in its binary form $Y$ with the $X$ by the binary comparator 110; at the moment when the logic level 1 appears at the output 3 of decoder 48, this occuring when the last figure of counter 47 is set by the arrival at the output of the gate 109 of a logic level 1, by way of gate 108, the comparison of $X$ and $Y$ creates a new logic level equal to one on the single output of the comparitor 110 if and only if $X$ is greater than $Y$; at this moment the counter 115 which controls the successive input states of switch 116 having been reset to zero at the moment when the counter 47 entered its last state, the distributor is in a condition to write in the new debit.

Writing-in of new debit

In practice, the switch 46 being in its 3 input condition, is connected with the debit memory 51 by way of the coupling 124 to write-in a new debit of which the amount is simultaneously deducted in the same manner as above by the sequential adder/subtractor 49 in stable binary notation and subtracted in the display device 69. It should be noted that the rising monostable trigger 81 plays the same part for the debit memory 51 as it played for the credit memory 50, that is to say that writing into the memory is effected always on the first empty page detected and not on that following, which is also a blank page. On the other hand, the output 3 of decoder 48 being at logic level 1 sets the debit memory 51 in a writing condition during this last stage of operation of the apparatus, by way of the coupling 123, at the end of this phase a general stop command is produced by tripping of the trigger circuit 42 by the presence of a 1 logic level at its "clear" input CL by way of the OR gate 86, following upon release of the AND gate 111, which itself was made conductive by the presence at its input of a positive impulse arising at the nought output of decending monostable 140, acting in the same manner as at the end of writing a new credit into the memory 50. The operation of delivering the bank-notes not shown, occurs at the same time as this writing-in of the new debit into the debit memory 51, in accordance with the sum of which the amount has been previously written in decimal notation by the carrier of the ring, by the use of the keyboard 63, and tested as we have previously seen.

The manner of transformer coupling for feeding the ring from the co-operating apparatus has been chosen and represented in FIG. 1 in a manner ensuring electrical isolation; the secondary 105 of the transformer constituted by the windings 151 and 105 during their cooperation is followed by a filter 107 supplying at its output a stabilized direct supply voltage, a non-capacitive filter is preferred for miniaturization, the capacity necessary for a normal filter cannot be made sufficiently small with respect to other electronic elements; this supply coupling may also be effected by optical coupling between a luminous source contained in the co-operating apparatus and a photovoltaic pile contained in the portable electronic device, thus again ensuring desired electrical isolation so as to avoid all risk of short circuit destroying the memories contained in the ring, for the same reason as the other optical couplings which have been chosen for the circulation of logic levels between the co-operating apparatus and the ring. The three memories of which the operation have been described are in principal of the same type; of the integrated circuit type, they have the property of being susceptible to writing upon demand, in a progressive and irreversible manner (except for certain type of memories which can be erased in a non-accidental fashion but by appropriate treatment); these memories, in addition to the fact that their capacity is some 1,000 times higher per unit surface to those of magnetic memories generally employed for this type of application, present the advantage with respect to these latter of a higher facility and flexibility of reading and writing owing to the fact that they do not require the immediate proximity of the reading device; their addressing being carried out electronically, the expensive, sophisticated and unreliable electro-mechanical devices are thus replaced by simple conductors of which the number may also be reduced by the procedure known as multiplexing. Among this family of integrated circuit memories, non-volatile memories are preferably employed.

The display device 69 provides simple visualization by the appearance of luminous numbers, but it may be also replaced by a print-out, this print-out could also have its inputs connected in parallel, which would allow the carrier of the ring to retain a written trace of the reading operations effected by the co-operating apparatus in the course of the operation described above.

Figure 4:
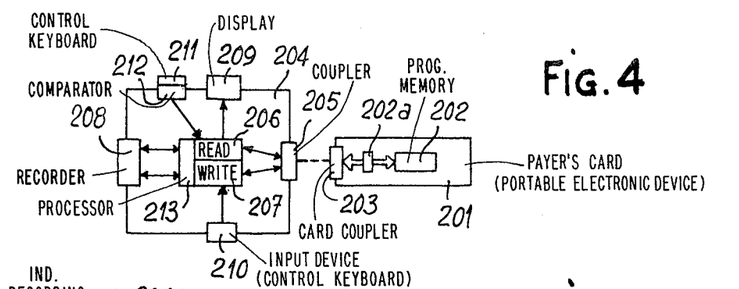
FIG. 4 is a diagram reproducing in a synoptic manner the principal of the data transfer system described with reference to FIG. 1.

FIG. 4, which presents a diagram showing in synoptic form the principal of the system of data transfers as applied in banking will now be described.

The payer's card 201 includes a programmable memory 202 of the semiconductor type associated with control circuits and with coupling means 203 (especially in the form of a comblike array of male contact members). The card contains in its memory the identification data of the payer (especially his secret code, the number of his bank account), the list of the various credit operations and the list of the various debit operations.

The specific data recording device 204 situated at the point of sale includes coupling means 205 (especially in the form of an array of female contact members) arranged to receive the coupling means 203 of the card. The specific data recording device 204 further comprises reading means 206 and writing means 207 (also known as memory programmers) intended respectively to read the contents of the card and to write into it the new data, particularly the result of the transaction; these reading means 206 and writing means 207 are interconnected with the coupling means 205 of the specific data recording device. The reading means 206 and the writing means 207 are likewise connected to a display device 209 permitting the monitoring of the transfer of data between the card and the specific data recording device. The writing means 207 are likewise connected to an input device 210 (for example a control keyboard) permitting the introduction into the card of data which must appear here, particularly the amount of the purchase effected. The reading means 206 are likewise connected with a control keyboard 211, associated with an identification comparator 212; these means are arranged on the one hand to compare the confidential identification data of the payer (appearing in his card) with the confidential code introduced directly by the payer into the specific device by means of an input device 211 (for example a control keyboard) and, on the other hand, to authorise the setting in operation of other means of the specific data recording device in the case of a positive correlation of the identification data and the confidential code. In addition, the specific device 204 includes processing means 213 connected to reading means 206 and to writing means 207; these processing means 213 are arranged to effect certain operations, starting with the data transferred between the card and the specific data recording device; in particular they are arranged to effect the following operations:

old balance: (sum of credits) − (sum of debits)

new balance: old balance − amount of purchase.

Finally, the specific data recording device 204 comprises recording means 208 connected to the reading and writing means; these recording means 208 are arranged to record all or part of the data transferred between the specific data recording device and the card in such a manner that the trader may keep in his possession a record of the transaction effected after the payer has removed his card.

Figure 5:
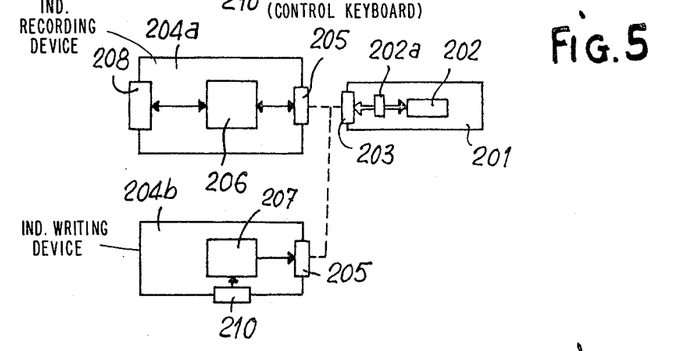
FIG. 5 shows the block diagram of a simplified embodiment of data transfer system.

It will be noted that certain of the means described with reference to this special banking application of the system in accordance with the invention are not indispensible, except in this particular banking application. In a simplified form the general data transfer system which may be extracted from the particular embodiments is represented in the five following Figures. Elements and means identical with those previously described carry the same references. This system is composed on the one hand of a plurality of specific independent data recording devices distributed in geographically fixed positions (only one is shown in FIG. 5 at 204a), on the other hand of a plurality of independent writing devices distributed in geographically fixed positions (one only is shown in FIG. 5 at 204b) and finally of a plurality of portable electronic devices (one only is shown in FIG. 5 at 201).

The portable electronic device comprises a memory 202 associated with a control circuit 202a and including recording sections which are programmable in an irreversible manner; preferably this memory is an inert memory of the semiconductor un-powered type; preferably likewise this memory is incorporated in the interior of the said portable electronic device in an inaccessible manner. The portable electronic device further comprises coupling means 203 permitting it to be temporarily coupled at will with the specific recording device 204a.

The writing device 204b comprises a writing means 207 permitting data to be written into the programmable memory of the portable electronic device when this latter is coupled to the writing device by way of the coupling means 203 and 205. A control keyboard 210 connected to the writing means 207 allows the introduction into the card of the data which must appear there.

It will be seen that the writing devices 204b are indispensible only in the case when the system is intended to transfer data into the portable electronic device; similarly, it is only in this case that it is necessary to provide a memory 202 comprising programmable or reprogrammable recording sections.

Figure 6:
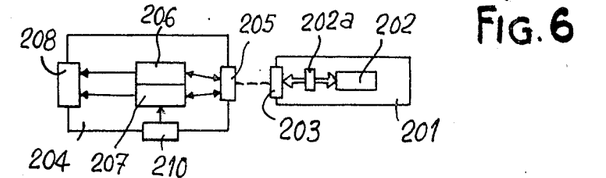
FIG. 6 shows the block diagram of another simple embodiment of the data transfer system.

Preferably, for certain modified embodiments, such as that which is represented in FIG. 6, the devices for recording and writing are interconnected and are associated in the same specific data recording device 204.

Another modification of the transfer system will now be described by reference to FIG. 7, which shows the special construction of the recording means in accordance with the invention.

There will be recognised in this Figure most of the elements described with reference to FIG. 5; they carry the same references, that is to say: the client's card 201, the writing device 204b, the recording device 204a, etc. In this case the recording means 208 is composed of the following elements:

On the one hand an independent portable electronic device 219 (for example a card) comprising a possible programmable inert memory 218 associated with a control circuit 218a and connected to coupling means 217.

On the other hand (in the specific recording device 204a) writing means 215 connected to reading means 206 and to coupling means 216 (these coupling means 216 are arranged to be couplable to the coupling means 217 of the card 219). The writing means are arranged to write into the memory of the card 219 the data read by the reading means 206 in the memory 202 of the card 201.

Owing to this second card it now becomes possible to store in an easily transportable manner all or a part of the data contained in the card 201 and transferred to the recording device 204a. This card 219 may in its turn be read in another device comprising reading means, another recording device, for example. The writing device 204b, the presence of which is indispensible only in certain applications, allows new data to be written either in the card 1 (when this comprises a programmable memory providing sections for recording), or in the card 219; this writing device may be placed at any suitable position where writing must be effected.

It is clear that the recording means 208 described with reference to FIGS. 4 to 6 may be constructed as has just been described with reference to FIG. 7. In particular, the device 204 (described with reference to FIG. 4) installed at a trader's premises, may comprise such a recording means 208. Thus the trader has in his possession a trading card on which are automatically recorded the number of the client's bank account and the amount of the purchase. These trading cards play the part of a virtual connection between the point of sale and the bank; on each go and return journey between the point of sale and the bank, this latter (by means for example of a reading device associated with a central computer) learns the contents of the memory, causes the amounts of the various sales to be paid by the banks of the various purchasers and credits the trader's account. In addition the new data may be introduced into the trader's trading card; for example, a list of the numbers of the cards of clients with respect to whom a banking objection is raised. It is thus possible, owing to the system of client's cards and trading cards, to exchange data without telephone communication and in arbitrary language between clients and traders who are geographically dispersed and towards a central organisation: a bank.

Figures 7, 8:
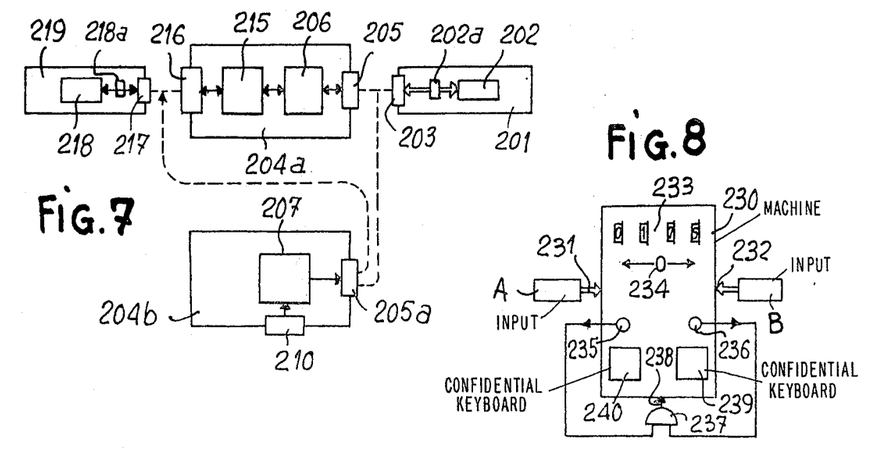
FIG. 7 shows the block diagram of another embodiment of the data transfer system, showing the special construction of the recording means.
FIG. 8 shows an embodiment of the data transfer and exchange system in accordance with the invention, applied to a banking transaction between two persons.

FIG. 8, which represents a more general transaction system, will now be described. In this system all the cards are identical, and the distinction between "client" and "trader" vanishes.

The apparatus 230 here includes two inputs 231 and 232 for the cards A and B, a value selector 233 (for example with "code wheels") together with an operation selector 234 allowing a choice between the two following operations:

A pays B

A is paid by B

The transaction takes place if the two parties push their buttons 235 and 236 at the same time; in this case the gate 237 is enabled energizing the unlocking conductor 238. The apparatus may include two confidential keyboards 239 and 240 serving to identify the bearers of the cards A and B.

Such an apparatus, arranged in such a manner as to be fraud-proof, is installed at any location at which a transaction is to be effected, and thus allows all cash money to be dispensed with. Each proprietor of a card, by showing possession of a certain sum of money (arising automatically from his salary, for example), will as a preliminary, 'load' his card with that amount of money, for example in a bank. The card is afterwards 'discharged' little by little, to the amount of the disbursements which he effects by means of the machines 230. If, on the other hand, he receives on his card more money than he expends, he may in the same manner 'empty' his card at the bank, thus crediting his account (in the case of a trader, for example).

Other types of data than numerical may obviously be exchanged by means of such a system of cards: especially alpha-numerical data for example in the body of an individual health record, or, for example, in connection with a system of check-points (each point being provided with a reader/memory programmer).

What is claimed is:
1. A system for data transfer between a first and a second population of persons, the persons in each of said populations being at dispersed locations, said system being characterized by including:
 a. a plurality of independent data recording devices placed at fixed locations;
 b. a plurality of first portable electronic devices each carried by a respective one of said persons, each said portable electronic devices comprising:
  $b_1$. first memory means;
  $b_2$. coupling means operable at will temporarily to couple said first memory means to one of said data recording devices;
  $b_3$. memory control circuits coupled with said coupling means and said memory means; said memory means and said memory control circuits being in the form of logic micro-structures;
 c. each said data recording device comprising:
  $c_1$. reading means operable to read the contents of said memory means in said portable electronic devices when said memory means is coupled to said data recording device by said coupling means;
  $c_2$. data recording means coupled to said reading means to record data reading thereby.
2. The invention claimed in claim 1, wherein said data recording means comprises:
 a. writing means disposed within said recording means;
 b. at least one further independent portable electronic device including;

$b_1$. further memory means having a plurality of programmable sections;

$b_2$. externally accessible coupling means connected to said memory means and operable at will temporarily to couple said further memory means with said writing means of said recording means;

$b_3$. further memory control circuits coupled with said externally accessible coupling means and with said further memory means;

$b_4$. said further memory means and said further memory control circuits being constructed as logic micro-structures.

3. The invention claimed in claim 2 and further comprising a plurality of writing devices disposed at fixed locations, wherein:

a. said first memory means includes recording sections operable to store data to be transferred, in a readily portable form;

b. said coupling means of said portable electronic device is operable at will temporarily to couple said first recording sections of said first memory means with a said writing device;

c. each said writing device comprises writing means operable to enter data into said first memory means of a portable electronic device coupled with said writing device, whereby any person of one of said populations may receive data from any person of the other of said populations.

4. The invention claimed in claim 2 wherein said memory devices of said portable electronic means are unpowered memory means.

5. The invention claimed in claim 4 wherein said memory means of said portable electronic devices are incorporated in the interiors of said devices in an inaccessible manner.

6. The invention claimed in claim 3 wherein said recording device and a said writing device are interconnected and associated in a single data-transfer device.

7. The invention claimed in claim 2 and wherein:

a. each of said portable electronic devices includes a second memory means permanently programmed with identification data;

b. each said recording and/or writing device includes:

$b_1$. data entry means operable to introduce identification data into said recording and/or writing device;

$b_2$. identification comparator means having input arranged to be coupled to said second memory means and to said data entry means; said identification comparator means operating to compare said programmed identification data with said introduced identification data and, when said compared data correspond, to enable said recording and/or writing device.

* * * * *